Figure 1:
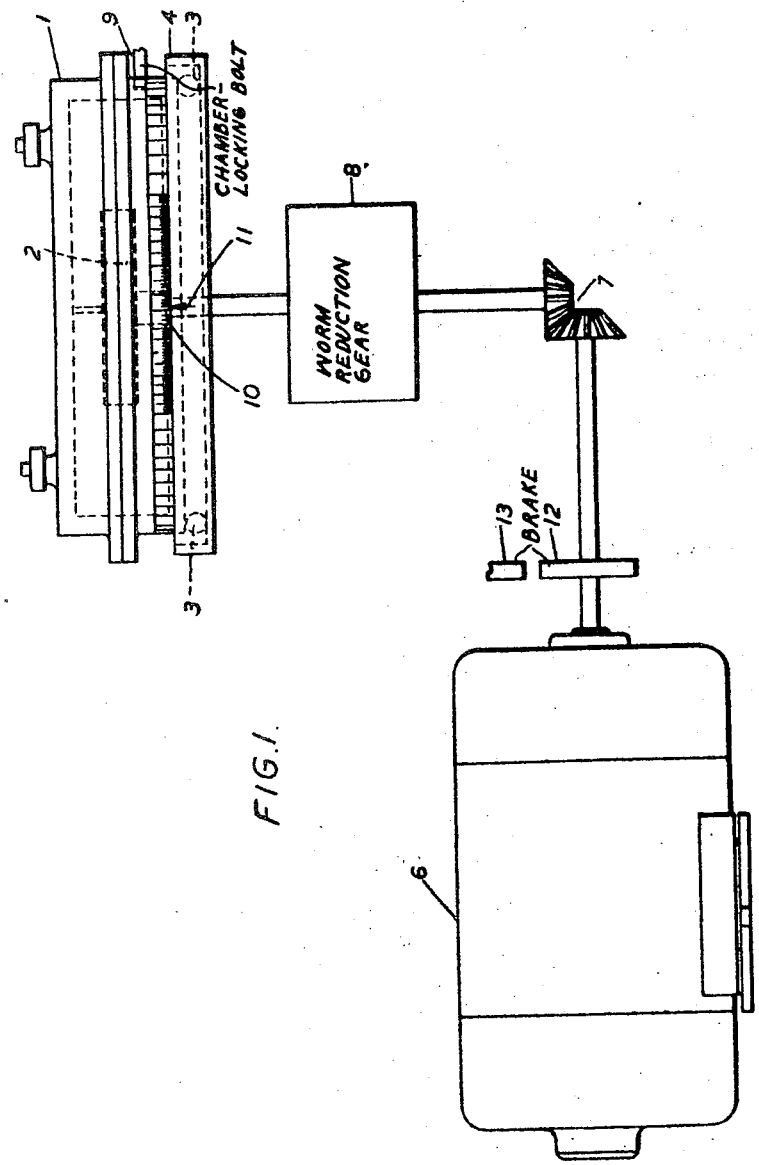

Sept. 23, 1947.  H. A. MACDONALD  2,427,796
INSTRUMENT FOR MEASURING PROPERTIES OF RUBBER AND RUBBERLIKE MATERIALS
Filed Aug. 17, 1945  2 Sheets-Sheet 1

Inventor
Hector A. Macdonald
by
Stebbins, Blenko & Webb
Attorneys

Inventor
Hector A. Macdonald
by
Stebbins, Blenko & Webb
Attorney

Patented Sept. 23, 1947

2,427,796

UNITED STATES PATENT OFFICE 2,427,796

INSTRUMENT FOR MEASURING PROPERTIES OF RUBBER AND RUBBERLIKE MATERIALS

Hector Atherton Macdonald, Gravesend, England, assignor to W. T. Henley's Telegraph Works Company Limited, Westcott, Dorking, England, a British company Application August 17, 1945, Serial No. 611,006
In Great Britain September 5, 1944

5 Claims. (Cl. 73—54)

This invention is concerned with the measurement of properties of unvulcanised rubber and rubber-like materials, by means of an instrument of the kind known as a rotary disc or rotary cylinder plastometer. An instrument of this kind comprises a member in the form of a body of revolution to which steady slow rotation can be imparted within a stationary chamber. There is a clearance between the rotary member and the chamber wall which is adapted to be completely filled with the material to be tested in such a way that the material is kept under pressure during the test.

In using such an instrument the clearance space is filled with the material to be tested and the chamber is closed and pressure applied to it. The movement of the rotary member is then started and the torque applied to the member is measured. The rotation is continued until the torque has reached a steady value. The material under test adheres to the surfaces of the chamber and of the rotary member within it, this surface being appropriately roughened or ribbed to ensure that there is no slipping. Accordingly, as rotation takes place there is deformation of the material by shearing and the torque may be regarded as a measure of the shearing viscosity of the material.

The present invention is concerned with the measurement of another property, namely that which brings about what is known as recovery of the material after deformation. This property is made evident by a tendency of the material to reverse the deformation when the force producing it is removed. In accordance with the invention the instrument is so constructed that this tendency may become effective in producing an unrestrained movement of recovery, the extent and rate of which may be observed and measured.

In the general construction of the instrument there is a stationary chamber, the interior surface of which is a surface of revolution about an axis, and within the chamber is the rotary member, the outer surface of which is also a surface of revolution about the same axis. These parts are dimensioned and shaped so as to provide between the two surfaces a space of form and dimensions appropriate for the test. The rotary member is integral with or mounted on a shaft which passes out through a bearing in one wall of the chamber and engages a reduction gear through which movement is imparted to the rotary member. Usually the drive to the shaft of the rotary member is through a high ratio worm and worm-wheel and the torque is measured by observing the value of the endwise thrust on the shaft on which the worm is carried. Such a gear prevents backward rotation of the rotary member under recovery forces when the driving force of the motor is removed.

The chamber is made in two or more parts so that it can be opened for the insertion of the material to be tested. This insertion may involve also the temporary removal of the rotary member. When the filling of the chamber is completed, the chamber is closed and the parts are forcibly pressed together, extruding surplus material so as to ensure complete filling. There are in addition other means, such as spring loaded plungers acting on the material within the chamber to compensate for any reduction of volume, such as may occur by the release of gas which has been entrapped in the material.

For the purpose of the test to be carried out by the apparatus in this known form it is obvious that the stationary chamber must be firmly anchored so that it is not displaced by the torque exerted on it during the test.

In accordance with the invention the stationary chamber is not permanently anchored but is free to move relative to its support in rotation about its axis. Means are provided, such as a clamp or lock, by which anchorage can be effected as required, so as to permit of the carrying out of the normal test. When this is completed the anchoring means is released and, since the rotary member is now held stationary by the worm drive or otherwise, the forces of recovery rotate the chamber about its axis. A pointer or other indicating member is carried on the chamber and co-operates with a fixed reference member, such as a scale, or vice versa, so that the extent of the rotation produced by recovery and its rate can be observed.

The freedom to rotate may be obtained by mounting the chamber on low friction bearings, such as ball or roller bearings, inserted between the chamber and the base. Alternatively, the chamber may be floated in a mercury bath, or may be suspended centrally by a long flexible member extending upward to a fixed support so as to offer very small resistance to twisting. Other friction-reducing means may also be employed.

Figure 2:
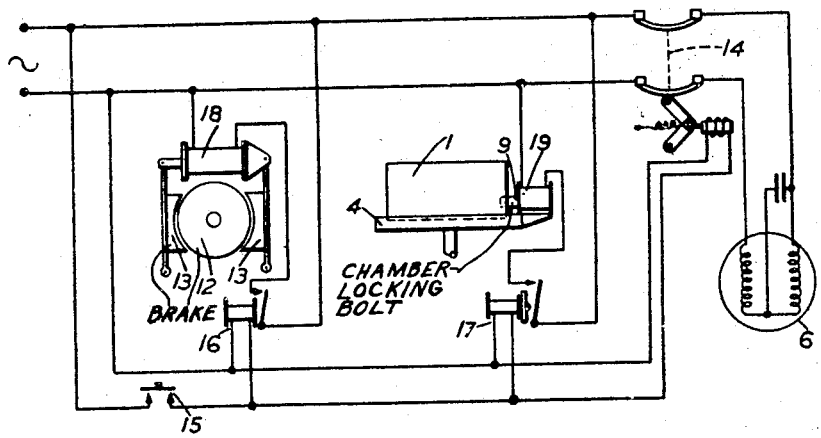
Figure 3:
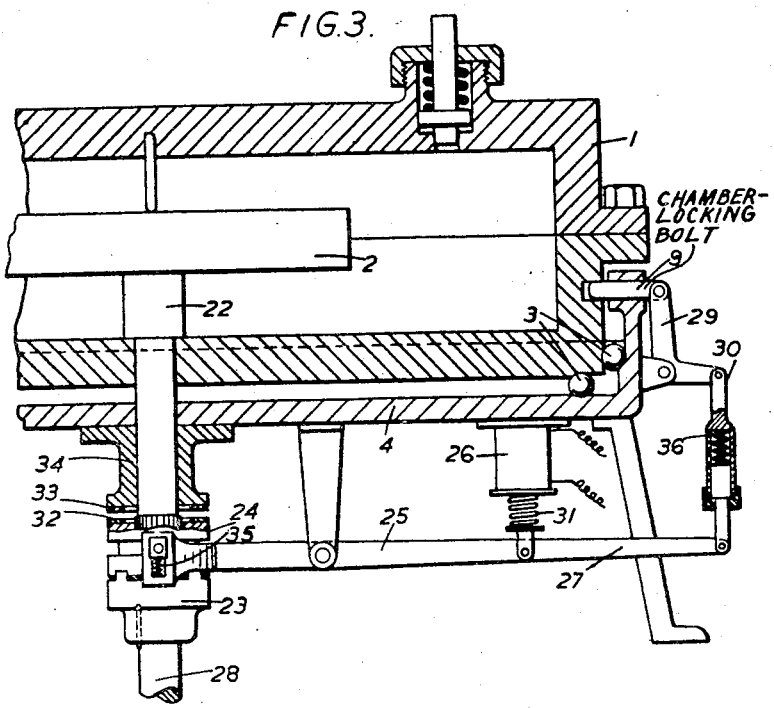

To enable the invention to be more fully understood and readily carried out, it will be further described with the aid of the accompanying diagrammatic drawings wherein:

Figure 1 is an elevation of an example of a plastometer constructed in accordance with the invention, Figure 2 is a circuit diagram showing one form of chamber release mechanism for the plastometer shown in Figure 1, and Figure 3 is a fragmentary view partly in elevation and partly in section of a plastometer of the type shown in Figure 1 fitted with an alternative form of chamber release mechanism.

Referring first of all more particularly to Figure 1, it will be seen that the plastometer chamber 1 housing the rotor 2 is rotatably supported by ball bearings 3 in a fixed tray 4. The rotor 2 is carried on a vertical rotor shaft that passes out of the chamber through the bottom wall thereof and also through the tray. The rotor shaft is driven by the motor 6 through bevel gearing 7 and a high ratio worm reduction gear 8. For the measurement of shear viscosity of material within the chamber 1, the chamber is held against its tendency to rotate with the rotor 2 by a bolt 9 which enters a recess in the peripheral wall of the chamber. When this test is completed the motor is stopped and the bolt 9 is withdrawn. As the rotor is locked by the worm gear 8, the forces of recovery rotate the chamber 1. The extent of this effect is measured by means of a degree scale 10 around the periphery of the chamber and a co-operating pointer 11 on or carried by the fixed tray 4.

It will be appreciated that to obtain an effective measurement of the recovery value, the rotor 2 should be arrested suddenly and the chamber 1 released for rotation preferably at the instant the rotor comes to a standstill. To this end, the motor 6 is provided with a stopping device, for instance, a brake comprising a drum 12 and brake blocks 13, and the operation of the motor, of the brake and of the bolt are interlocked, as shown in Figure 2. The supply to the motor 6, here shown as a split phase A. C. motor, is controlled by an independently tripped circuit breaker 14, the trip coil of which is energized by a push button 15. Closure of the push button also energises a relay 16 and a retarded relay 17. Operation of relay 16 energises a solenoid 18 which applies the brake. Operation of the retarded relay energises a solenoid 19 which withdraws the bolt 9 from the chamber wall. In this way the motor is stopped quickly and, by appropriately setting the retarded relay 17, release of the chamber 1 can be arranged to take place just as the rotor 2 comes to a stop. With this arrangement the chamber is locked by hand before restarting the motor for a further test.

As the inertia of the armature of the motor will generally be high, it may be advantageous to insert a dog or other clutch in the drive to the rotor so that the armature can be mechanically disconnected, either manually or automatically when the motor is switched off. This clutch may be inserted in the drive to the gear box, between the motor and the brake drum, in which case the rotor will become locked by the gear box. Alternatively, both the armature and the reduction gear may be declutched from the rotor, in which case other locking means for the rotor are necessary. In the arrangement shown in Figure 3, the rotor shaft 22 is coupled to the worm wheel shaft 28 of the reduction gear 8 by a dog clutch consisting of a fixed part 23 and a sliding part 24 which is splined to the rotor shaft as shown. When the motor is running, the part 24 is pressed downwards into engagement with the part 23 by means of the pivoted forked lever 25 and the solenoid 26 which may be connected on the motor side of the circuit breaker controlling the running of the motor. An extension 27 of the lever 25 also holds the bolt 9 in its locking position by means of the bell crank 29 and link 30. When power to the motor is switched off, the solenoid 26 is de-energized and the compressed spring 31 presses down the lever 25 to disengage the clutch and, as soon as it is disengaged, to operate a stopping device to stop the rotor quickly. This device may provide a positive stop, or as shown, may comprise a friction disc 32 on the upper surface of the part 24 which is pressed into contact with a friction disc 33 on the under face of the shaft support 34. As the lever is pressed down by the spring, the bolt 9 is partly withdrawn. Further downward movement of the lever, which is permitted by compression of the springs 35 in the ends of the forked lever, completely withdraws the bolt, leaving the chamber free to rotate in its tray as the rotor is brought to a standstill. On switching on the motor for a further test, the solenoid 26 is re-energised. This takes off the brake and throws in the clutch. As the rotor moves round, the chamber is also pulled round by the drag of the material until the bolt hole and bolt are brought into register, whereupon the bolt is shot home by the spring 36 in the link 30 which was compressed during the upward movement of the lever 25.

What I claim as my invention is:

1. A plastometer for the measurement of recovery properties of unvulcanized rubber and other materials of a rubbery nature, comprising a rotary member, a rotatable chamber housing said rotary member and adapted to be filled with and to retain under pressure the material under test, means for rotatably driving said rotary member, means for anchoring said chamber against rotation, means for stopping the rotary member, means for releasing the chamber anchoring means to permit forces of recovery in the rubbery material to rotate the said chamber, and means for indicating the extent of rotation of said chamber.

2. A plastometer for the measurement of recovery properties of unvulcanized rubber and other materials of a rubbery nature, comprising a rotary member, a rotatable chamber housing said rotary member and adapted to be filled with and to retain under pressure the material under test, means for rotatably driving said rotary member, means for anchoring said chamber against rotation, means for stopping the rotary member, means interlocked with said stopping means, for releasing the chamber anchoring means as said rotary member is brought to rest, to permit forces of recovery in the rubbery material to rotate the said chamber, and means for indicating the extent of rotation of said chamber.

3. A plastometer for the measurement of recovery properties of unvulcanised rubber and other materials of a rubbery nature, comprising a rotary member, a rotatably supported chamber housing said rotary member and adapted to be filled with and to retain under pressure the material under test, a motor for driving said rotary member, releasable means for anchoring said chamber against rotation, a device for stopping the rotary member, a clutch inserted in the drive to the rotary member between the motor and the stopping device and means interlocking said clutch with said stopping device and said anchoring means, whereby said stopping device becomes operative when said clutch is opened and said anchoring means is released as said rotary member is brought to rest.

4. A plastometer for the measurement of recovery properties of unvulcanised rubber and other materials of a rubbery nature, comprising a rotary member, a rotatable chamber housing said member and adapted to be filled with and retain under pressure the material under test, a motor for driving said rotary member, releasable means for anchoring said chamber against rotation, a switch for controlling the supply of power to said driving motor, a trip coil for opening said switch, a brake for stopping the motor driven member, a relay for operating said brake, a retarded relay for releasing said anchoring means, and means for simultaneously energising said trip coil and said relays, whereby to stop the rotary member quickly and release the chamber anchoring means as the rotary member is brought to rest.

5. A plastometer for the measurement of recovery properties of unvulcanised rubber and other materials of a rubbery nature, comprising a rotary member, a rotatable chamber housing said member and adapted to be filled with and retain under pressure the material under test, a shaft for driving said rotary member, a clutch inserted in the drive to said rotary member and comprising two parts, one slidable on said shaft into and out of engagement with the other, a stopping device comprising a stationary part and a rotatable part carried on the slidable part of said clutch and adapted to engage with the stationary part, a lever for moving the slidable part of said clutch, whereby to disengage the clutch and operate the stopping device, a slidable bolt engaging the chamber and restraining it from rotation, and means linking said bolt with said lever, whereby said bolt is withdrawn from engagement with said chamber as said stopping device is operated.

HECTOR ATHERTON MACDONALD.

REFERENCES CITED

The following references are of record in the file of this patent:

UNITED STATES PATENTS

| Number | Name | Date |
| --- | --- | --- |
| 1,327,838 | Naylor | Jan. 13, 1920 |
| 2,305,531 | Hurndall | Dec. 15, 1942 |
| 2,340,507 | Bjork | Feb. 1, 1944 |

FOREIGN PATENTS

| Number | Country | Date |
| --- | --- | --- |
| 843,609 | France | Mar. 27, 1939 |